UNITED STATES PATENT OFFICE.

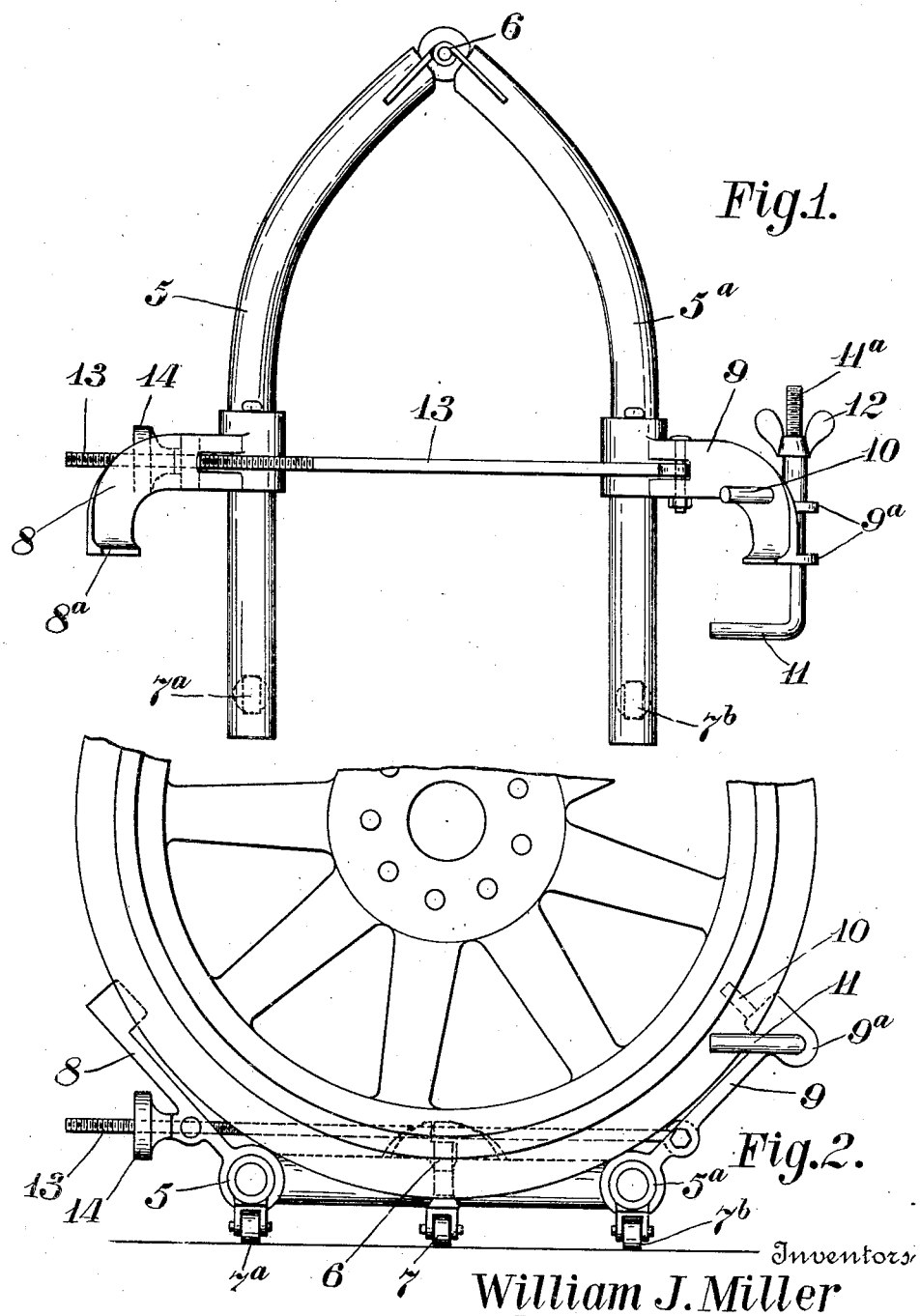

WILLIAM J. MILLER AND LEE A. FRAYER, OF COLUMBUS, OHIO.

COMBINED TRUCK AND JACK.

1,361,889.                    Specification of Letters Patent.     Patented Dec. 14, 1920.

Application filed December 24, 1919. Serial No. 347,186.

*To all whom it may concern:*

Be it known that we, WILLIAM J. MILLER and LEE A. FRAYER, citizens of the United States, residing at Columbus, in the county of Franklin and State of Ohio, have invented a certain new and useful Improvement in Combined Trucks and Jacks, of which the following is a specification.

The wheels of motor vehicles are often quite heavy, in some instances weighing as much as eighteen hundred pounds. The hubs and axles of such wheels require frequent removal for lubrication or repair and because of the weight of such wheels the job of removing and replacing them is onerous and time-consuming and therefore expensive. The object of the present invention is the provision of an improved device or combined truck and jack whereby such wheels may be removed and replaced with ease and economy. It is especially an object of the invention to provide a form of device in the use of which the usual mud guard presents no obstacle.

The invention is embodied in the example herein shown and described, the features of novelty being finally claimed.

In the accompanying drawing—

Figure 1 is a plan view of the device.

Fig. 2 is an end view of the same showing a fraction of a wheel sustained thereon.

The main frame of the device comprises a pair of bars 5 and 5ª similarly curved at their ends and hinged together at such ends as seen at 6. In order that the device may be moved about easily the frame is supported upon three rollers, one designated 7 located at the hinged junction of the bars and the other two, designated 7ª and 7ᵇ, on the bars forward of the plane where the wheel is to be supported by the frame. Hinged on the bars 5 and 5ª are keeper arms 8 and 9 respectively. The keeper arm 8 has a hook portion 8ª adapted to engage the tread of the tire of the wheel to be removed, while the arm 9 is equipped with a pin 10 and a hook member 11 to engage the sides of the tire. The hook member 11 has a threaded shank 11ª slidable in a pair of eyes 9ª on the arm 9, said threaded shank being provided with a butterfly nut 12 for drawing the hook 11 against the side of the tire and pinching the latter between said hook and the pin 10 to hold the wheel firmly in erect position on the truck. The pin 10 and hook 11 can be duplicated on the other arm 8 but the pin 10 and hook 11 in conjunction with the hook 8ª are ordinarily sufficient to hold the wheel in erect position on the truck. The keeper arms 8 and 9 are connected by means of a threaded rod 13, said rod 13 being hinged to the keeper 9 and extended at its threaded end beyond the keeper 8 where it is provided with a nut 14 abutting against said keeper, said nut being adapted to be turned to draw the keepers as well as the frame bars toward each other.

In using our invention the axle containing the wheel to be removed is first jacked up and then the truck rolled toward the wheel until the keepers stand in the same vertical plane with and to receive the wheel. The screw rod 13 is then turned in the proper direction to draw the frame arms 5 and 5ª toward each other and the keepers into engagement with the tire or rim at its lower side as shown in Fig. 2. In practice the screw 13 should be turned until substantially the entire weight of the wheel is borne by the truck after which, and the removal of the hub cap or other parts securing the wheel to the axle, the truck may be drawn away taking the wheel and exposing the spindle and bearing for lubrication or repair. Because the wheel and the jacked-up axle are retained in their respective horizontal elevations during the lubricating operation simple axial alinement and shoving into place is all that is necessary to restore the wheel to the spindle after lubrication or other treatment.

It will be noted that with our truck, as shown, the wheel is engaged and supported at its lower portion only, hence the usual mud guard does not interfere with its application or operation.

The forms of the parts can be changed without departing from the gist of the invention as claimed.

What we claim is:

1. A combined truck and jack for a wheel comprising a frame composed of horizontally arranged bars hinged together to straddle the wheel at its lower portion, and means for adjusting said bars toward each other and into engagement with the wheel.

2. A combined truck and jack for a wheel comprising a frame composed of horizontally arranged bars hinged together to straddle the wheel at its lower portion, means supported by said frame for engaging the wheel at the tire and means for drawing said engaging means into engagement with the tire.

3. A combined truck and jack for a wheel comprising a frame composed of horizontally arranged bars hinged together to straddle the wheel at its lower portion, means supported by said bars to engage the wheel, and means for drawing the bars and said engaging means into engagement with the wheel.

4. A combined truck and jack for a wheel comprising a frame composed of horizontally arranged bars hinged together to straddle the wheel at its lower portion, means for engaging the wheel supported by said bars, and means for drawing said bars together to cause the engagement of said engaging means with the wheel, said means consisting of a connecting rod and means for actuating said connecting rod, substantially as described.

5. A combined truck and jack for a wheel comprising a frame composed of horizontally arranged bars hinged together to straddle the wheel at its lower portion, keepers hinged on said bars and means for drawing said keepers toward each other to engage the wheel.

6. A combined truck and jack for a wheel comprising a frame including horizontally arranged members movable toward each other to straddle the wheel at its lower portion, and means for adjusting said members.

WILLIAM J. MILLER.
LEE A. FRAYER.